United States Patent [19]

Daiber et al.

[11] Patent Number: 5,229,181
[45] Date of Patent: Jul. 20, 1993

[54] TUBULAR KNIT CLEANROOM WIPER

[75] Inventors: Hermann Daiber, Litchfield, Conn.; John Mizia, Lenox, Mass.

[73] Assignee: Amber Technologies, Burlington, N.C.

[21] Appl. No.: 605,641

[22] Filed: Oct. 30, 1990

[51] Int. Cl.$^5$ .................. B32B 27/02; B32B 7/04; A47K 10/00; D04B 1/06

[52] U.S. Cl. .................. 428/58; 15/209.1; 66/147; 66/169 A; 66/169 R; 66/172 R; 66/196; 428/57; 428/192; 428/193; 428/196; 428/197; 428/198; 428/220; 428/224; 428/225; 428/245; 428/246; 428/253

[58] Field of Search ......... 428/192, 193, 246, 253, 428/913, 224, 197, 198, 57, 58, 196, 220, 225, 245, 57, 104; 15/209 R; 156/250; 83/869, 13; 66/147, 169 R, 172 R, 196, 169 A

[56] References Cited

U.S. PATENT DOCUMENTS

| | | | |
|---|---|---|---|
| 1,323,212 | 11/1919 | Bulley | 156/88 |
| 1,773,967 | 8/1930 | Dreyfus . | |
| 2,551,811 | 5/1951 | Mueller | 83/170 |
| 2,744,844 | 5/1956 | Wood Jr. et al. | 428/121 |
| 2,972,554 | 2/1961 | Muskat et al. | 428/360 |
| 3,087,846 | 4/1963 | Soltis | 156/88 |
| 3,378,429 | 4/1968 | Obeda . | |
| 3,393,110 | 7/1968 | Slade | 428/197 |
| 3,483,069 | 12/1969 | Cairns et al. | 428/113 |
| 3,486,957 | 12/1969 | Fish et al. | 156/88 |
| 3,546,063 | 10/1954 | Breen | 428/364 |
| 3,567,537 | 3/1971 | Marteny et al. | 156/91 |
| 3,755,033 | 8/1973 | Emus | 156/88 |
| 3,784,427 | 1/1974 | Griffin | 156/139 |
| 3,823,047 | 7/1974 | Colombo | 156/309.9 |
| 3,855,037 | 12/1974 | Imhagen et al. | 156/497 |
| 3,856,599 | 12/1974 | Bylund | 156/88 |
| 3,861,124 | 1/1975 | Bentzien | 53/373.8 |
| 3,971,868 | 7/1976 | Murai | 428/194 |
| 4,021,283 | 5/1977 | Weikert | 53/434 |
| 4,065,049 | 12/1977 | Achelpohl et al. | 383/111 |
| 4,069,727 | 1/1978 | Sparks et al. | 83/16 |
| 4,174,804 | 11/1979 | Bosse | 156/88 |
| 4,274,896 | 6/1981 | Bosse | 156/88 |
| 4,298,649 | 11/1981 | Meitner | 428/198 |
| 4,307,143 | 12/1981 | Meitner | 428/156 |
| 4,384,021 | 5/1983 | Aoyana . | |
| 4,410,383 | 10/1983 | Lipari | 156/73.1 |
| 4,428,995 | 1/1984 | Yokono et al. | 428/193 |
| 4,436,780 | 3/1984 | Hotchkiss et al. | 428/198 |
| 4,525,411 | 6/1985 | Schmidt | 428/198 |
| 4,534,819 | 8/1985 | Payet et al. | 156/55 |
| 4,560,427 | 12/1985 | Flood | 156/73.3 |
| 4,594,955 | 6/1986 | Lichtenberg . | |
| 4,610,750 | 9/1986 | Mango | 156/510 |
| 4,653,362 | 3/1987 | Gerber | 83/16 |
| 4,693,771 | 9/1987 | Payet et al. | 156/73.3 |
| 4,711,693 | 12/1987 | Holze, Jr. | 156/580.1 |
| 4,745,912 | 5/1988 | McMurray | 128/90 |
| 4,755,242 | 7/1988 | Miller et al. . | |
| 4,823,783 | 4/1989 | Willhite, Jr. et al. . | |
| 4,888,229 | 12/1989 | Paley et al. | 428/192 |
| 4,947,659 | 8/1990 | Tyler | 66/147 |

FOREIGN PATENT DOCUMENTS 0112654 7/1984 European Pat. Off. .

*Primary Examiner*—George F. Lesmes
*Assistant Examiner*—James D. Withers
*Attorney, Agent, or Firm*—McCormick, Paulding & Huber

[57] ABSTRACT

A wiper for use in cleanrooms and other controlled environments is made using a knit fabric tube rather than a fabric sheet. The fabric tube is knit with a diameter approximately equal to the preferred wiper dimension and is presented directly to an apparatus for sealing and cutting. A sequence of spaced strips are fused into the fabric tube perpendicular to its length. Individual two ply wipers are separated from one another along a cut line midway in the strips. The wipers are characterized by lower costs due to fewer fabrication steps and a 50% reduction in the number of wiper edges requiring treatment.

29 Claims, 1 Drawing Sheet

TUBULAR KNIT CLEANROOM WIPER

TECHNICAL FIELD

The present invention relates to textile wipers adapted for use in cleanrooms or other controlled environments and more particularly to wipers made from a tubular knit fabric.

BACKGROUND OF THE INVENTION

Cleanrooms and other environments in which contamination is to be controlled have special requirements for the materials to be used therein. Of paramount concern is the generation of particulate contamination. It is well known that particulates can be brought into the cleanroom environment by workers themselves and by the materials which they use. In this regard, items which are subject to abrasion or wear are a cause of special concern.

Cleanrooms are characterized by a special emphasis on the prevention of particulate generation and the removal thereof prior to deposition on cleanroom surfaces and products to avoid re-entry into the air at a later time. To that end, large volumes of air are flowed through the room, typically in a nested fashion, such that particles released into the cleanroom atmosphere will be quickly swept away. Structures which impede this process are either modified or eliminated. For example, gratings are substituted for solid shelving. In addition, dust generators such as paper or boxes are strictly for precluded from entry. In another effort eliminating particulate generation, the workers are clothed in special garments which not only contain the debris generated from the human body, hut also are themselves resistant to particulate generation as a result of abrasion or wear.

It has long been recognized that fabrics are subject to fraying regardless of construction. Not only will the woven or knit fibers or filaments unravel, that is separate one from another, but the filaments are subject to material damage from both the cutting process in cloth fabrication and by subsequent use in the cleanroom. For cleanroom applications, the fabrics typically chosen include a high percentage of thermoplastic fibers, such as polyester, nylon, polypropylene and other related thermoplastic fibers and yarns, and are either of Woven or knit construction.

Cleanroom garments and wipers have most recently incorporated edge treatment to control fraying. Known edge treatments include a hem wherein a portion of the edge is folded back onto itself and into the body of the material to encapsulate the edge within a portion of the fabric material. This approach is effective in reducing particulate contamination, but requires expensive processing of the garment or wiper.

For thermoplastic materials an edge ca be treated by heat to fuse a portion of the area at the edge and a margin adjacent thereto. Techniques for fusing edges and creating a boundary include the woven textile fabric and method and apparatus for making the same in U.S. Pat. No. 4,534,819. Disclosed therein is a woven textile fabric with at least 65% thermoplastic fibers having an edge which is ultrasonically sealed and cut to prevent the fraying of the edge. Fabric made in accordance with the '819 invention has a border extending inward from the edge of between 1/100th to 1/10th of an inch to encompass between 2 and 4 of either of the warp or filing yarns which extend parallel to the cut edge.

U.S. Pat. Nos. 4,560,427 and 4,610,750 disclose ultrasonic seal and cut methods and apparatus for sealing and cutting fabric having thermoplastic filaments. The '427 and '750 techniques generate a sealed marginal area extending backward into the fabric from the edge. The prior art also includes U.S. Pat. No. 3,087,846 which discloses a method of trimming an edge sealing textile fabrics. The '846 method incorporates a hot wire device which knives through a piece of thermoplastic fabric. The '846 method cuts the fabric, creating opposed edges in two subpieces. The '846 method includes sealing simply the immediate edges as well as melting or fusing a portion of the marginal areas surrounding the edges to create a fused border extending into the fabric a distance of ¼ of an inch.

U.S. Pat. No. 4,888,229 discloses a wiper for use in a cleanroom. The '229 wiper includes thermoplastic material having a fused border around the peripheral edges. The '229 wiper is made from a sheet of fabric having thermoplastic material knit or woven therein. The '229 wiper is fabricated by fusing regions within a fabric sheet of indeterminate size, thereafter, the individual wipers are cut from one another. wipers made in accordance with the '229 method are fabricated from individual sheets which can be combined thereafter to create a wiper of one or more plys. Multi-ply wipers made from individual sheets require that the several plys be registered with one another prior to the generation of a fused border or marginal region.

Characteristic of the '229 wiper is fused border around the entire wiper periphery since the wiper is made from a fabric sheet. Sheets are formed, for example, by slitting a knit fabric tube in a longitudinal direction. Therefore each edge in a wiper will incorporate a cut edqe and will need edge treatment. Fused borders are also undesirable in that they are subject to failure unless they extend into the wiper a substantial distance i.e. approximately 3/10 of an inch. The ahrasiveness of the fused portion is likewise undesirahle.

It would be advantageous to have a wiper for use in a cleanroom which is inexpensive to manufacture and has only a limited number of cut or free edges which require modification. The present invention is drawn towards such a wiper.

SUMMARY OF THE INVENTION

An object of the present invention is to provide for a multi-layer wiper for use in cleanrooms characterized hy only two edges which require edge modification.

Another object of the present invention is to provide for a wiper of the forgoing type in tubular form made by means of a circular knitting machine.

Still another object of the present invention is to provide for a wiper of the foregoing type which is made with a method having a reduced number of fabrication steps.

According to the present invention, a particulate free textile article adapted for use in a clean environment includes a tubular fabric having a plurality of thermoplastic fibers. The tubular fabric has a diameter and a length. The article has first and second sealed edges formed by opposed margin areas fused into the tubular fabric approximately perpendicular to the length and parallel to the tube diameter to form two plys. Third and fourth opposed edges are of continuous fabric and are substantially perpendicular to said first and second edges.

According to another aspect of the present invention, a wiper for use in a cleanroom is made in accordance with a method that includes the steps of forming a tube of fabric having a plurality of thermoplastic fibers, with the fabric tube having a diameter and an indeterminate length. Opposed margin areas are fused in the fabric tube spaced from one another and approximately parallel to the flattened fabric tube width. The fused margin areas extend along the diameter and form two wiper plys. The method also includes the step of cutting the fused margin areas at a line extending the length thereof and positioned approximately midway therein.

DESCRIPTION OF THE PREFERRED EMBODIMENT

Figure 1:
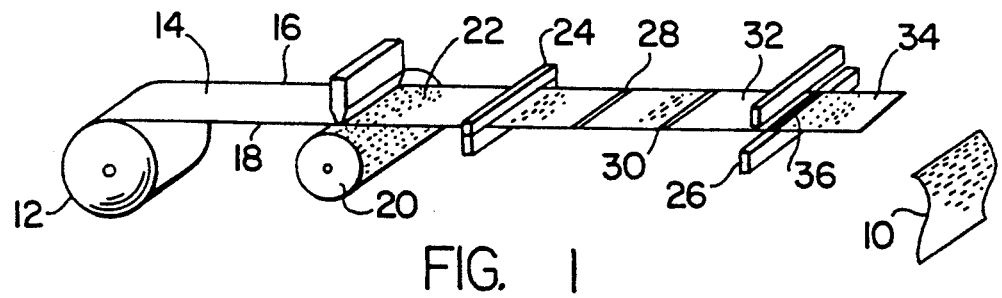
FIG. 1 is simplified schematic illustration of a method of manufacturing a wiper provided according to the present invention.
Figure 2:
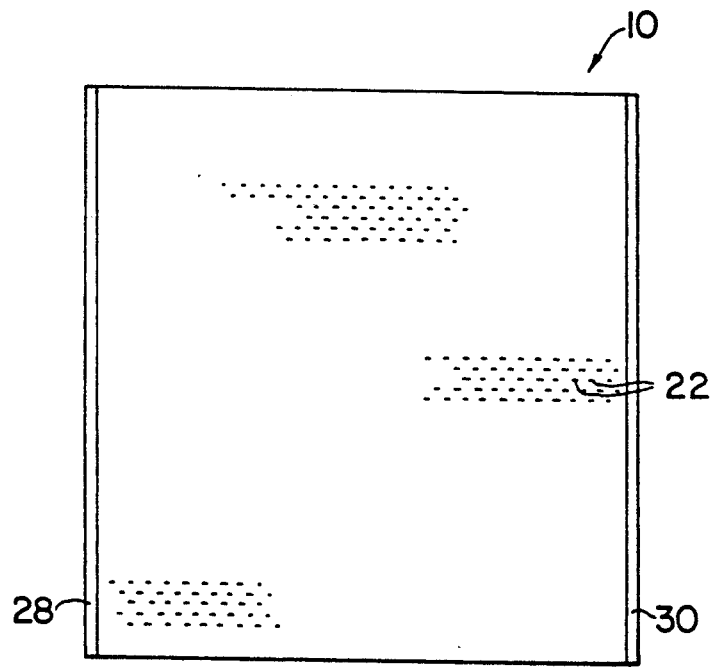
FIG. 2 is top illustration of a wiper made in accordance with the method outlined in FIG. 1.

Referring first now to FIGS. 1 and 2, there is shown in schematic form a method of manufacture and a wiper 10 provided according to the present invention. The wiper 10 is used in cleanroom or controlled environments as detailed hereinabove and is preferably comprised of continuous filament yarn polyester fabric. Polyester, nylon or polypropylene fibers are especially suited for cleanrooms as they tend to retain their knit integrity during use and are resistant to fiber shedding. Polyester materials, however, are burdened in that they are hydrophobic. Therefore, any absorbency of liquids is due to capillary action between the fibers as opposed to absorption by the fibers themselves These materials also strike a balance between absorbency and low particulate emission, and are also preferable in that amount of extractable matter, such as oil, is low and they are essentially inert to cleanroom chemicals.

Typically, a wiper fabric is formed on a circular knitting machine which knits fibers into a tubular fabric having a single or double knit construction. The tubular fabric output from the knitting machine has a diameter that is a function of the diameter of the knitting machine. It is well established that the economies of scale in fabric manufacture dictate that larger knitting machines be used. The tubular fabric has a correspondingly large diameter. Known knitting machines employed commercially have a diameter of approximately 30 inches.

The tubular fabric is flattened into a fabric structure having essentially two plys and wound onto take up reels. In the prior art the flattened tube of fabric is then provided to a cutting machine which longitudinally slits the tube of fabric to create a large sheet whose length is indeterminate, but whose width is approximately the magnitude of the circumference of the fabric tube. A plurality of slit tubes are then be assembled in registration with one another on a cutting table where the material is overlaid with a pattern and simply cut with a knife. For use in cleanrooms, it is preferable to have either a 12 inch or 9 inch square wiper. Thereafter, the fabric sheets are cut accordingly.

For those applications such as the present one where edge treatment is desired, the individual sheets of fabric are presented to a machine which will generate a sealed edge and/or fused border. Typical machines used to seal and cut sheet fabric include those described hereinabove and manufactured hy the Branson Ultrasonics Corporation. The large sheet from which the individual wipers are cut first have a pattern of thermoplastic regions fused therein, with a subsequent process for separating each individual wipers from one another. To form a two ply wiper, two or more sheets are placed in registration with one another before commencing with the above referenced sealing and cutting operation. Thereafter, the wipers are cleansed before final packaging.

In contrast, the present wiper is knit from a polyester continuous filament yarn on a circular knitting machine whose diameter is greatly reduced as compared to commercially viable knitting machines. That is, the machine either produces a circular fabric tube of prefab either 12 or 9 inches in approximate flattened width diameter which is stored upon a take-up reel 12. The fabric tube output from the circular knitting machine is flattened into a "two ply" fabric 14 having a width approximately equal to ½ the circumference of the tube of fabric. As a flattened tube the fabric has a weight base of 140 gm/m² for both plys, with the peripheral edges 16 and 18 being continuous extensions of one ply with the other. As used herein, "ply" then refers to each of the two layers of the flattened tube.

To fabricate the wipers, the fabric 14 is preferably presented first to a rotary drum type sealer 20 to create a series of bonds between the two plys of the fabric. For this purpose it is preferable to use a machine, such as a manufactured by the Chase Machinery Company of Warwich, Rhode lsland, that creates a series of small fused welds 22, approximately one millimeter in diameter spaced 5 mm apart. Those skilled in the art will note that it is possible to directly proceed from the knitting operation to the steps outlined herein. However, the knitting process has a higher throughput, and compensation therefor must then be introduced.

Thereafter the two ply fabric is presented to sealing and cutting machines 24, 26. The machines are of a known type and are adapted to receive the two ply fabric of a reduced flattened width. The sealed regions are approximately 0.5 inch in width. The regions are also under a nominal pressure during a sealing cycle where the fabric is heated to 460° F. for 5 seconds and cooled for 9 seconds for a total cycle time of about 14 seconds. The machines are schematically shown in FIG. 1 as being discrete. However those skilled in the art will recognize that both operations may be accomplished by a single device. Also, the machines outlined in FIG. 1 further comprise such conventional gears motors and the like as is needed to accomplish the functions detailed herein.

Fused regions 28 and 30 are created in the tubular fabric of approximately 9 or 12 inches or any other chosen length a part preferably by resistive heater associated with the sealing machine 24. Alternatively, an ultrasonic type heater can be substituted. The fused regions incorporate both plys. The machine 26 separates wipers 32, 31 from one another along cut line 36. The wipers are two ply, approximately square and are rectangular if so desired and have only two fused ends with the remaining edges of continuous fabric.

The advantages of the wiper provided by the present invention are numerous. Those skilled in the art will note that the fabrication process described herein for prior art wipers inherently results in a wiper whose entire periphery requires edge treatment. This fact has been recognized by the present inventors to stem from the use of a fabric sheet which always generates a wiper having four cut edges. Nominal cost reductions may be found by alterations in the scale of manufacture. However, no significant savings can be found by tinkering with the prior art, since the manufacturing steps remain the same and the intermediate wiper product is identical in structure.

The present inventors were first to recognize these fundamental limitations and to suggest that a tubular knit of reduced diameter is a key element in a wiper of improved performance and reduced cost. The number of steps in wiper production is decreased with the present wiper since the need to split the fabric tube and handle the sheet is eliminated. Since the whole tube is used and the product is finished to the ultimate width, it is only necessary to cut and seal the material in the cross direction. The other two wiper edges maintain the same continuous knit construction as the body of the fabric.

The number of wiper edges which need modification in the present wiper are reduced by 50% over prior art wipers. This is important, as fused or sealed edges are prone to mechanical failure despite the addition of fused margins therewith. The reduction in the number of sealed edges, therefore, lead to significant reductions in particle or fiber generation due to tears in the fused margins when the wiper is in use. Also, abrasion of the product is reduced with a lower number of fused edges. There is a substantial increase of absorbancy with the present invention due to the additional layer of fabric providing greater capillary area. The expected increase of absorbancy is approximately between 50 and 75%. The wiper provided according to the present invention is also characterized by a textured surface which allows better surface cleaning characteristics then conventional single layer polyester materials.

The present invention allows for cost savings in another area, as the weight base of the polyester can be adjusted. Moreover, due to the use of a fabric tube scrap is virtually eliminated. As is known, sheet fabric is first stacked before being cut into a pattern. In doing so the individual sheets become misaligned. Therefore, about several inches of material are automatically precut from each edge to assure uniformity in the final patterned wiper or other product. The precut material constitutes scrap, and is unavoidably generated when using sheet material. There is no need to precut the present wiper. A wiper fabricated in accordance with the present invention provides an immediate 5 to 10% cost savings over wipers such as the '229 wiper because of the avoidance of this wasteful fabrication step.

The present invention also eliminates several manual cutting operations which will provide for additional cost savings. Moreover, the fabric tube provides an inherent self alignment of plys in the manufacture of two ply wipers. Since the present two ply wiper is fabricated from a single element, the plys are integral with one another and do not have to be aligned prior to any subsequent sealing and cutting operation.

Figure 3:
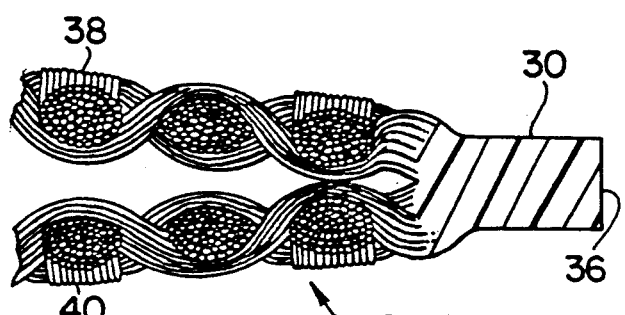
FIG. 3 is a schematic, sectioned illustration of a portion of a wiper provided according to the present invention.

FIG. 3 is a simplified, sectional illustration of an edge portion 30 of wiper 32 provided according to the present invention. The wiper has been fabricated as described above margin area extends into the fabric of each of plys 38 and 40 by an amount selected to ensure the physical integrity of the edge during cleaning and use and to ensure that loose fibers remain encapsulated, unable to unravel and fray. Preferably this margin will have an extent of up to 0.4 inch in each ply and will have a range between 2.5 and 8 mm or between 2.5 and 10 mm. Therefore, the fused area in the fabric tube described above will be twice this value since the cut line which forms the edge 36 will lie midway therein. Note that the extent of heating of the fused area can be varied to include a complete liquefaction of the thermoplastic fibers in the margin area such that no filament or fiber structure remains. Care should be exercised in the selection of the fusing parameters to ensure that the margin areas are sufficiently fused. Light fusing may, depending upon material, result in an edge which will fail in normal use.

Similarly, although the invention has been shown and described with respect to a preferred embodiment thereof, it would be understood by those skilled in the art that other various changes omissions and additions thereto maybe made without departing from the spirit and scope of the present invention. For example, those skilled in the art will note that the percent of thermoplastic fibers in the fabric can be varied in accordance with the application.

We claim:

1. A particulate-free, knitted textile article adapted for use in a clean environment, comprising:
    a tubular fabric comprising a plurality of thermoplastic fibers, said tubular fabric having a diameter and a length;
    first and second edges formed by opposed margin areas fused into said tubular fabric approximately perpendicular to said length and parallel to said tube diameter to form two plys; and
    third and fourth opposed edges formed by continuous fabric, said third and fourth edges being substantially perpendicular to said first and second edges.

2. The article of claim 1 wherein said fused margin areas are formed by ultrasonic heating.

3. The article of claim 1 wherein said fused margin areas extend up to 0.4 inch in each ply which is sufficient to prevent tearing thereabout.

4. The article of claim 1 wherein said plys are fused to one another away from said margin areas at least at one point.

5. The article of claim 4 wherein said two plys are fused to one another by a series of spaced bonds approximately one millimeter in diameter.

6. The article of claim 1 wherein said fabric comprises fibers selected from the group consisting of polyester, nylon and polypropylene.

7. The article of claim 1 wherein said fused margin areas are spaced apart a distance approximately equal to ½ the circumference of said tube.

8. The article of claim 1 wherein said fused margin areas extend between 2.5 and 8 mm into each ply.

9. The article of claim 1 wherein said fused margin areas include a portion thereof without residual fiber structure.

10. A knitted wiper having given dimensions for use in a clean environment; said wiper made in accordance with a method comprising the steps of:
    knitting a tube of fabric having a plurality of thermoplastic fibers;

forming said tube of fabric into a flattened two-ply fabric having a width, approximately equal to one half of the tube circumference, and a length;

fusing margin areas in said two-ply fabric, spaced from one another by an amount approximately equal to the two-ply fabric width and extending substantially parallel to said two-ply fabric width to form two plys joined at said margin areas; and cutting said fused margin areas at a line extending the length of said fused margin areas and positioned approximately midway therein.

11. The wiper of claim 10 further comprising the steps of fusing said wiper plys to one another at least at one point in an interior wiper region spaced from said margin areas.

12. The wiper of claim 11 wherein ply fusing step further comprises the steps of fusing said two plys to one another by a series of spaced bonds approximately one millimeter in diameter.

13. The wiper of claim 10 wherein said tube of fabric comprises fibers selected from the group consisting of polyester, nylon and polypropylene.

14. The wiper of claim 10 wherein said fusing step further comprises the step of fusing said margin areas such that substantially no fiber structure remains in said fused margin areas.

15. The wiper of claim 10 further comprising the steps of cleaning said wiper.

16. The wiper of claim 10 wherein said two-ply fabric has a weight base of approximately 140 gm/m² for both plys.

17. The wiper of claim 10 wherein said wiper width and length are between 9 and 12 inches.

18. A two ply knitted wiper having given dimensions for use in a clean room, comprising:

a tubular fabric formed from a continuous knit structure of fabric comprising thermoplastic fibers, said tubular fabric flattened to form two plys having a width and a length;

first and second opposed peripheral edges of said fabric, each edge having a thermally fused margin area joining said two plys to one another and extending inwardly into the fabric a distance of between 2.5 and 10 mm, said first and second edges being spaced apart a distance approximately equal to said width; and third and fourth peripheral opposed edges of said fabric joining said first and second edges and continuous with said two plys.

19. The wiper of claim 18 wherein said fused margin areas are formed by localized heating.

20. The wiper of claim 18 wherein said fused margin areas extend up to 0.4 inch in each ply which is sufficient to prevent tearing thereabout.

21. The wiper of claim 18 wherein said plys are fused to one another away from said fused margin areas in an interior wiper region at least at one point.

22. The wiper of claim 21 wherein said two plys are fused to one another away from said fused margin areas by a series of spaced bonds approximately one millimeter in diameter.

23. The wiper of claim 21 wherein said plys are fused to one another away from said margin areas in an interior wiper region at an array of points.

24. The wiper of claim 18 wherein said fabric comprises fibers selected from the group consisting of polyester, nylon and polypropylene.

25. The wiper of claim 18 wherein said wiper width and length are between 9 and 12 inches.

26. The wiper of claim 18 wherein said tubular fabric has a weight base of approximately 140 gm/m² for both plys.

27. A two ply knitted wiper for use in a clean environment made in accordance with a method comprising the steps of:

knitting a tube of fabric comprising a plurality of thermoplastic fibers;

fusing margin areas in said tube, spaced from one another by an amount approximately equal to one half circumference of said tube of fabric to form two plys joined at said margin areas;

fusing said plys to one another at an array of points in an interior wiper region; and cutting said fused margin areas at a line extending along said fused margin areas and positioned approximately midway therein.

28. A two ply knitted wiper for use in a clean room, comprising:

a tubular fabric formed from a continuous knit of fabric comprising thermoplastic fibers and flattened to form two plys;

first and second opposed peripheral edges having a thermally fused margin area joining said two plys to one another and extending inwardly into the fabric a distance of between 2.5 and 10 mm, said first and second edges being spaced apart a distance approximately equal to one half circumference of the tubular fabric an array of points in an interior wiper region at which said plys are fused to one another; and third and fourth peripheral opposed edges of said fabric adjacent to said first and second edges and continuous with said two plys.

29. The wiper of claim 28 having a width and length, wherein said wiper width and length are between 9 and 12 inches.

* * * * *